(12) United States Patent
Lytle et al.

(10) Patent No.: US 11,345,617 B2
(45) Date of Patent: May 31, 2022

(54) MICROWAVE DRYING APPARATUS FOR THE MINIMIZATION OF DRINKING WATER PLANT RESIDUALS

(71) Applicant: U.S. Environmental Protection Agency, Washington, DC (US)

(72) Inventors: Darren A. Lytle, Liberty, OH (US); Mallikarjuna N. Nadagouda, Mason, OH (US)

(73) Assignee: U.S. ENVIRONMENTAL PROTECTION AGENCY, Washington, DC (US)

( * ) Notice: Subject to any disclaimer, the term of this patent is extended or adjusted under 35 U.S.C. 154(b) by 576 days.

(21) Appl. No.: 15/906,157

(22) Filed: Feb. 27, 2018

(65) Prior Publication Data

US 2018/0251384 A1    Sep. 6, 2018

Related U.S. Application Data

(60) Provisional application No. 62/600,737, filed on Mar. 1, 2017.

(51) Int. Cl.
   *C02F 1/30*      (2006.01)
   *H05B 6/80*      (2006.01)
   *C02F 11/131*    (2019.01)

(52) U.S. Cl.
   CPC ............ *C02F 1/302* (2013.01); *H05B 6/804* (2013.01); *C02F 11/131* (2019.01)

(58) Field of Classification Search
   CPC .... C02F 1/004; C02F 1/30–325; C02F 11/10; C02F 11/12; C02F 11/128; C02F 11/13–131; C02F 11/15–16; C02F 9/00; F26B 2200/02; F26B 2200/18; F26B 3/347; F26B 3/34; H05B 6/80; A61L 2/12
   USPC ........................................ 210/748.07, 748.08
   See application file for complete search history.

(56) References Cited

U.S. PATENT DOCUMENTS

| | | | | |
|---|---|---|---|---|
| 4,013,552 A | * | 3/1977 | Kreuter | C02F 3/24 210/612 |
| 4,631,133 A | * | 12/1986 | Axelrod | F23G 7/001 210/739 |
| 4,631,380 A | * | 12/1986 | Tran | A22C 11/006 219/697 |
| 5,507,927 A | * | 4/1996 | Emery | A62D 3/178 204/157.15 |

(Continued)

OTHER PUBLICATIONS

"The Electromagnetic Spectrum". Boundless Physics, <https://courses.lumenlearning.com/boundless-physics/chapter/the-electromagnetic-spectrum/> (Year: 2020).*

(Continued)

*Primary Examiner* — David P Angwin
*Assistant Examiner* — Nicholas A Ros
(74) *Attorney, Agent, or Firm* — Bacon & Thomas, PLLC

(57) ABSTRACT

A method and apparatus for treating residuals or waste streams from a plant, such as a drinking water treatment plant. The method includes the steps of obtaining plant residuals or waste streams from a water treatment plant and irradiating the plant residuals or waste streams using microwave radiation from a microwave source. The method also includes the step of drying the plant residuals or waste streams to a predetermined moisture, volume, or weight content reduction and disposing of the same.

11 Claims, 7 Drawing Sheets

(56) References Cited

U.S. PATENT DOCUMENTS

| | | | | |
|---|---|---|---|---|
| 5,968,400 | A * | 10/1999 | Wicks | A61L 11/00 |
| | | | | 219/679 |
| 6,013,137 | A * | 1/2000 | Egner | A61L 2/12 |
| | | | | 134/1 |
| 6,618,957 | B2 * | 9/2003 | Novak | F26B 3/343 |
| | | | | 34/264 |
| 6,824,694 | B2 * | 11/2004 | Kicinski | C02F 11/185 |
| | | | | 210/748.07 |
| 8,039,031 | B2 * | 10/2011 | Baianu | F26B 3/347 |
| | | | | 426/233 |
| 10,590,020 | B2 * | 3/2020 | Apul | C02F 11/143 |
| 10,751,770 | B2 * | 8/2020 | Park | B09C 1/06 |
| 2002/0192132 | A1 * | 12/2002 | Carlson, Jr. | C07C 51/48 |
| | | | | 203/88 |
| 2008/0282573 | A1 * | 11/2008 | Hein | F26B 17/26 |
| | | | | 34/265 |
| 2013/0134089 | A1 * | 5/2013 | Cote | C02F 3/30 |
| | | | | 210/605 |
| 2013/0161255 | A1 * | 6/2013 | Neculaes | C02F 11/12 |
| | | | | 210/632 |
| 2016/0214879 | A1 * | 7/2016 | Josse | C02F 11/04 |
| 2016/0229728 | A1 * | 8/2016 | McPherson | C02F 11/121 |
| 2017/0225094 | A1 * | 8/2017 | Ju | B01D 1/20 |
| 2018/0085800 | A1 * | 3/2018 | Westerhoff | B09C 1/00 |
| 2020/0010350 | A1 * | 1/2020 | Ekstrand | C02F 11/20 |

OTHER PUBLICATIONS

United States Environment Protection Agency, "Drinking Water Treatment Plant Residuals Management Technical Report" (Sep. 2011).

* cited by examiner

MICROWAVE DRYING APPARATUS FOR THE MINIMIZATION OF DRINKING WATER PLANT RESIDUALS

CROSS-REFERENCE TO RELATED APPLICATIONS

This application claims the benefit of U.S. provisional application No. 62/600,737, filed Mar. 1, 2017, and is incorporated by reference herein in its entirety.

FIELD OF THE INVENTION

The present disclosure relates to processing residuals or waste streams from a plant, and, more specifically, to treating residuals from a drinking water plant using microwave radiation.

BACKGROUND OF THE INVENTION

Drinking water treatment (DWT) plants are used to provide potable water to its customers or consumers. Typically, DWT plants receive water directly from a water source, e.g., river, lake, reservoir or wells, or from a secondary supplier. The DWT plants then processes or treats the received water prior to providing potable water to its customers or consumers. Water treatment operations can include filtration, precipitative softening, membrane separation, ion exchange, activated carbon filtering, disinfection, chlorination, sedimentation, and/or coagulation. During the processing or treatment of the water, the DWT plants treat the water and remove contaminants that are unhealthy or undesirable for consumption, which become waste streams or plant residuals. For example, such contaminants include aluminum, copper, lead, nitrates, barium, radium, selenate, ammonia, arsenic, cadmium, zinc, phosphorus, iron, manganese, potassium, and salts thereof, oil and grease, biochemical oxygen demand (BOD), materials at a pH that is significantly different from 7, settleable solids, total residual chlorine, chlorides, and suspended or dissolved solids, radionuclides, and/or other water plant impurities and wastes. Of these contaminants, solids are the most common pollutant in the plant residuals, where the suspended solids include inorganic, e.g., silt, sand, clay, and insoluble hydrated metal oxides, and organic matter, e.g., flocculated colloids and compounds that contribute to color, where the dissolved solids primarily consist of dissolved inorganic compounds.

The plant residuals are then disposed of, where common methods for plant residual disposal include discharging directly into an on-site sanitary sewer, discharging or shipping to a wastewater treatment plant, where the plant residuals are processed in sedimentation tanks and/or ponds and thickened or dried, discharging into a water body or stream, or using zero discharge methods such as, drying followed by landfilling, evaporation, recycling, land application, deep well injection, evaporation, and spray irrigation.

Given the regulatory constraints, disposal restrictions and the potentially hazardous nature of drinking water treatment plant residuals, developing effective, safe, affordable, and sustainable residual management practices is a critical consideration to any drinking water treatment design and environmental protection.

SUMMARY OF THE INVENTION

Accordingly, it is one of the aspects of the present invention to provide a method and apparatus that affordably and quickly reduces the amount of and/or treats residuals from a processing plant. A method is provided for treating residuals or waste streams from a drinking water treatment (DWT) plant that comprises the steps of obtaining plant residuals or waste streams from the DWT plant and irradiating the plant residuals or waste streams with microwave radiation. The method may further comprise the step of drying the plant residuals from the DWT plant to a desired moisture, weight, or volume reduction content percentage.

In one embodiment of the invention, the method is performed using batch mode operation, where the plant residuals or waste streams are irradiated with microwave radiation from a microwave source, such as a magnetron, in predetermined time intervals.

In another embodiment of the invention, the method is performed in continuous mode operation, where the plant residuals or waste streams are continuously dried on a conveyor or trough system using at least one microwave source.

The invention includes an apparatus for performing the microwave drying method.

The numerous advantages, features and functions of the various embodiments of the invention described herein will become readily apparent and better understood in view of the following description and accompanying drawings. The following description is not intended to limit the scope of the invention but instead merely provides exemplary embodiments for ease of understanding and practicing the invention.

BRIEF DESCRIPTION OF THE DRAWINGS

Examples of a method and apparatus according to different embodiments of the invention will now be explained in more detail with reference to the drawings, wherein.

Figure 1:
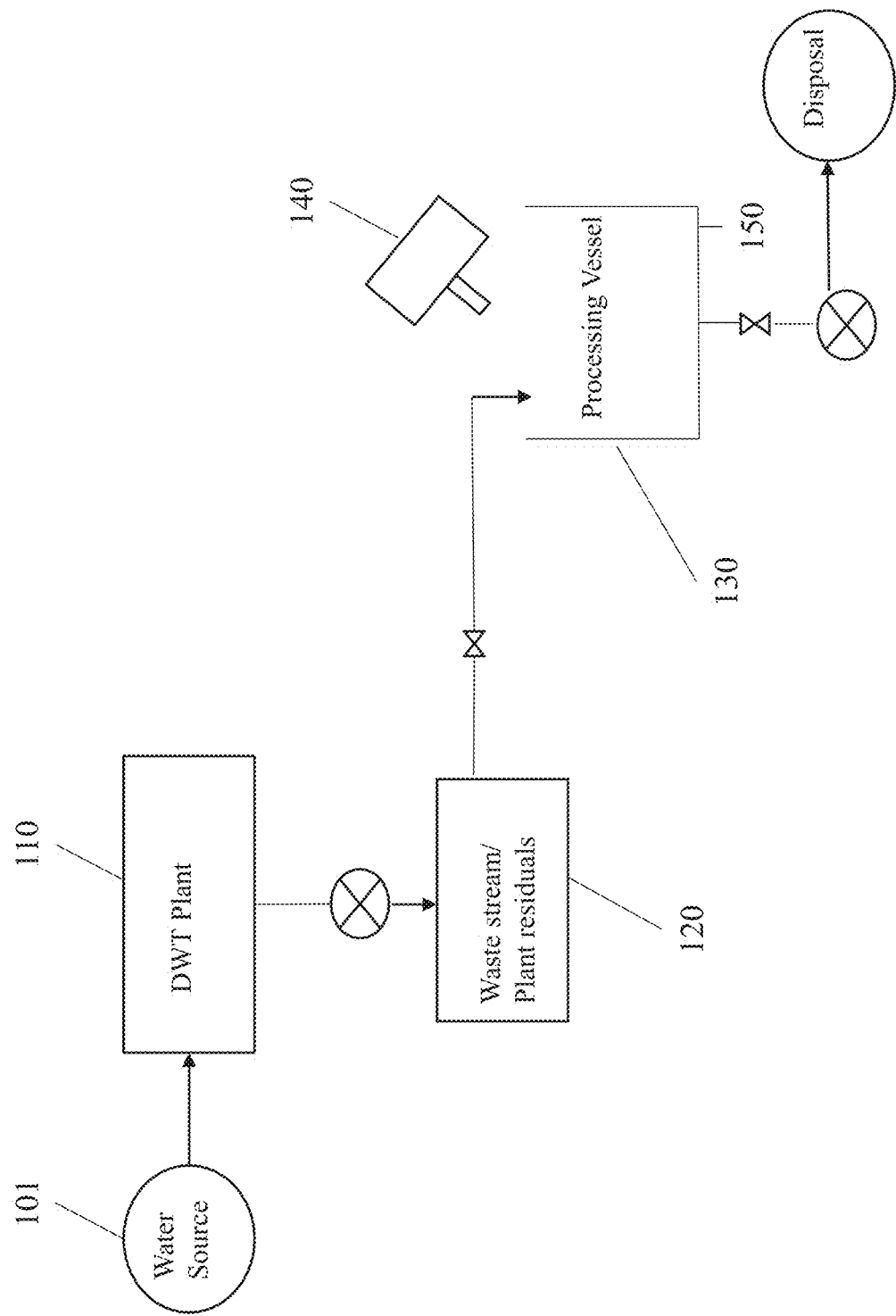
FIG. 1 is a schematic view of a drinking water treatment process.

In the various figures, similar elements are provided with similar reference numbers. It should be noted that the drawing figures are not necessarily drawn to any scale, or proportion, but instead are drawn to provide an understanding of the method and apparatus according to the invention. Thus, the illustrations are not intended to be limiting as to the scope of the invention described herein, but rather to provide exemplary illustrations thereof.

DETAILED DESCRIPTION OF THE INVENTION

A. Discussion of Various Embodiments

As generally discussed above, there is a need to develop an effective, safe, affordable, quick and sustainable plant residual management practice to reduce the total amount or volume of plant residuals or waste streams from a drinking water treatment plant for landfill or other disposal. Often, however, the development of such treatment is confronted by the choice of treatment being dictated by the waste streams, where the constraints in plant residuals limits the type of treatment alternatives. However, if the plant residuals did not have to be further treated, e.g., by further drying, more effective and efficient treatment choices could be made.

A method and apparatus for treating residuals from a processing plant, and more particularly, to drinking water treatment plant residuals, is provided, where the plant residuals are irradiated using microwave radiation.

Not only do alternative or renewable energy sources show significant promise in helping to reduce the green gas emissions and help to preserve many of the natural resources that we currently use as sources of energy, they can protect against harmful emissions and further dry samples in a more efficient manner. For example, microwave radiation is an efficient, environmentally friendly and economically viable heating method for many applications. Microwave technology is emerging as an alternative energy source powerful enough to accomplish chemical transformations in minutes, instead of hours or even days and, consequently, microwave radiation is presently seeing an exponential increase in acceptance as a technique for enhancing chemical synthesis.

For example, patents have been granted for equipment to remove volatile organic compound (VOCs) and semi-volatile organic compounds (SVOCs) from contaminated materials using microwave radiation, along with other hazardous constituents absorbed onto activated carbon. Additionally, a number of patents exist for the application of microwave radiation to mineral ores and heavy metal wastes including electroplating wastes, arsenic-containing wastes, and radionuclides. For radionuclides, these methods included desiccation, densification, pyrolysis, or vitrification. Furthermore, patents have been granted for the regeneration of adsorbent/desiccant materials (such as silica gel, activated alumina, zeolite) via microwave drying. For example, various patents exist where microwave heating is combined with a stabilizing agent such as thermoplastic resin or encapsulating material to minimize leaching. There are also patents for treating organic solids through an admixture of hydrogen peroxide and exposure to microwaves.

However, the prior art directed to the treatment of plant residuals from a processing plant, and specifically, a drinking water treatment plant, does not use microwave radiation, as in the present invention.

The present invention includes a method in which microwave radiation is used to irradiate plant residuals in the context of the drying and treatment of plant residuals, where it was found to be more effective than alternative sources of heating/drying, e.g., air or oven. That is, microwave irradiation was found to be a more efficient approach to greatly reducing waste volume and weight, and thereby allowing the use of more effective water treatment approaches at later stages, e.g., disposal. Specifically, the treatment of drinking water treatment plant residuals using microwave radiation compared to heating using conventional energy resources such as coal and oil, is more environmentally-friendly and, therefore, benefits both the economy and the environment. The present invention of microwave drying and treatment of the drinking water treatment plant residuals provides a quicker drying method to reduce the volume, weight, and moisture content of the drinking water treatment plant residuals.

In one embodiment of the invention, as illustrated in FIG. 1, a batch operation for the DWT treatment plant residual is shown. Specifically, water from a source 101 is provided to a drinking water treatment (DWT) plant 110, where the water source 101 can be pumped from a river, lake, reservoir, natural spring, or other fresh water source, or delivered from a secondary supplier. The DWT plant 110 processes or treats the water from the water source 101 to provide potable water to its customers or consumers. For example, the processing or treatment at the DWT plant can include, but not limited to, filtration, precipitative softening, membrane separation, ion exchange, activated carbon filtration, disinfection, chlorination, sedimentation, and coagulation. During this processing, the contaminants that are unhealthy or undesirable for consumption are separated, which become waste streams or plant residual streams 120, where the contaminants can include aluminum, copper, lead, nitrates, barium, radium, selenate, ammonia, arsenic, cadmium, zinc, phosphorus, iron, manganese, potassium, and salts thereof, oil and grease, biochemical oxygen demand (BOD), materials at a pH that is significantly different from 7, settleable solids, total residual chlorine, chlorides, and suspended or dissolved solids, radionuclides, or other water plant impurities and wastes.

As seen in FIG. 1, the waste streams or plant residuals 120 are then provided into at least one processing vessel 130 in a batch filling operation. The processing vessel 130 is a vessel that is open to the atmosphere, which avoids the dangers associated with over-pressurization when heated. Additionally, the processing vessel 130 can be a ceramic container, such as alumina, china crucible, or refractive material, or a stainless steel vessel lined with such ceramic material. Other materials that are capable of reflecting radiation, e.g., heat and microwave, can also be used and are not limited by this disclosure. Furthermore, the processing vessel can be contained in a separate vessel to avoid over-exposure of the microwave radiation to the environment, e.g., metal mesh screens, cages, or other structure that prevents microwave radiation from escaping. Additionally, multiple processing vessels can be used, where the plant residuals or waste streams are dried and/or treated in iterative steps.

A microwave source 140 such as a magnetic microwave source or magnetron is provided to irradiate the plant residuals or waste streams in or near the processing vessel 130 with microwave radiation. The microwave source 140 can be coupled to the processing vessel 130 or provided above the processing vessel to irradiate the plant residuals or waste streams.

While not wishing to be bound by theory, it is understood that the process of irradiating plant residuals or waste streams with microwave radiation at least includes providing radiation from a source, e.g., electromagnetic, that is used to expose the plant residuals or waste streams to electromagnetic radiation in the microwave frequency to produce thermal energy, e.g., dielectric heating. For example, the electromagnetic radiation source can be a magnetron having a given operating frequency and wavelength that is used to excite the plant residuals or waste streams or the water contained in the plant residuals or waste streams to a given temperature, e.g., between 90° C. and 125° C. measured by temperature sensors, in different intervals of time, for example, five minute periods until the moisture content reaches a predetermined level, e.g., 80%, 90%, or 95% or more moisture content reduction using, e.g., a moisture meter 150.

The microwave source 140 may have a power output between 0.1 and 100 kW to produce microwave radiation having a wavelength between 5 centimeters and 40 centimeters, where the plant residuals in the processing vessel are irradiated in predetermined time intervals until dried. For example, while a standard commercially available magnetron such as one that is used in a microwave cooking apparatus, e.g., Rival model RGC7702, can be used for batch processing small amounts of plant residuals, the microwave radiation can also be introduced using commercially available magnetron sources that produce wavelengths greater than 15 centimeters for large scale batch processing, e.g., 100 kW and 900 MHz.

Figure 2:
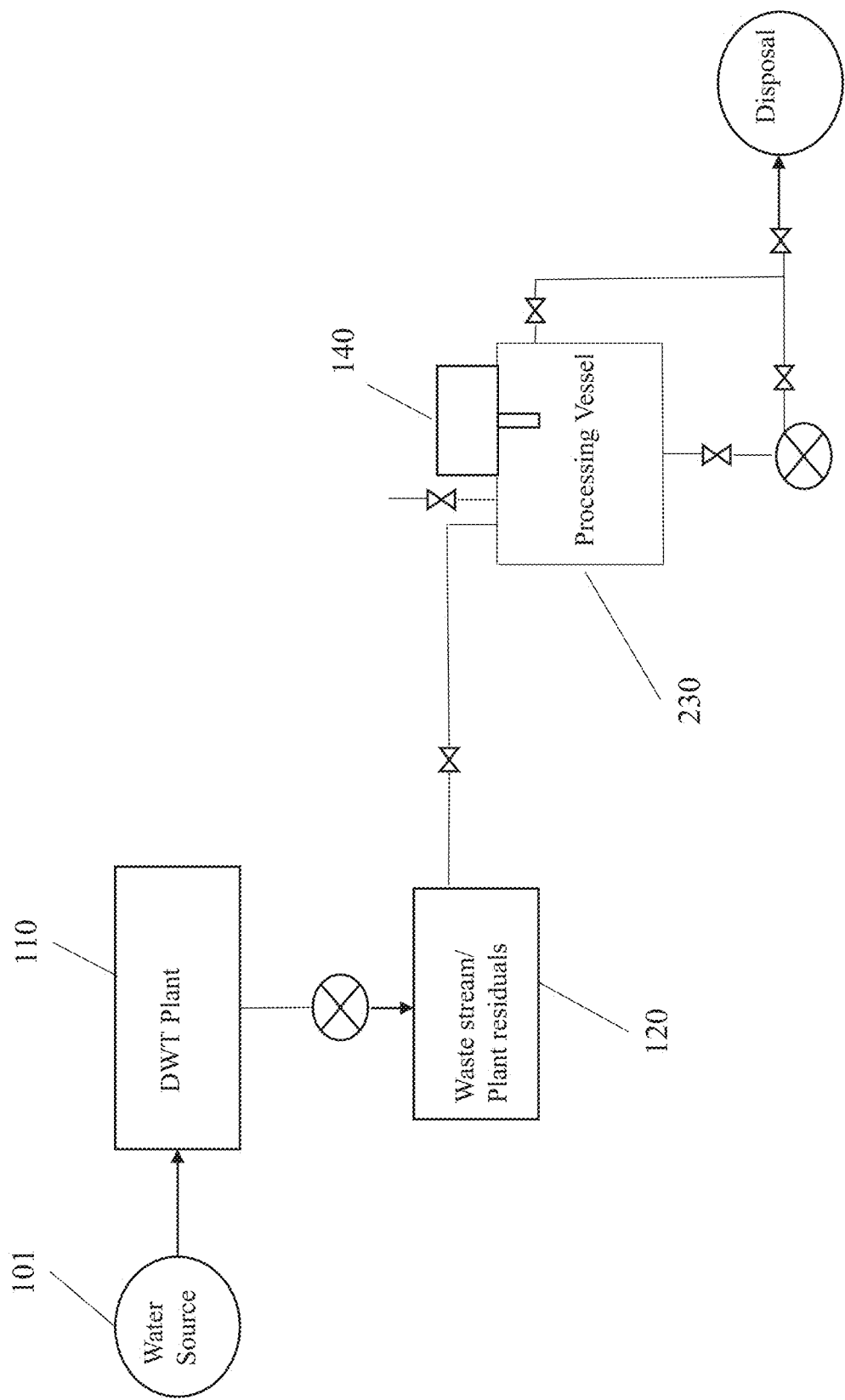
FIG. 2 is a schematic view of a second embodiment of a drinking water treatment process.

In another embodiment of the invention, as illustrated in FIG. 2, where like reference numerals refer to like elements, the plant residuals 130 from the DWT plant 110 are provided in a closed processing vessel 230. In this case, the microwave source 240 is provided so that the electromagnetic element or antenna protrudes into the processing vessel 230 to irradiate the plant residuals or waste streams inside the closed processing vessel 230. For example, the magnetron source is provided off-center or at the center through an opening in a top of the processing vessel and provides the microwave radiation downwards towards the plant residuals or waste streams.

In a similar manner as discussed above, the microwave radiation is used to heat the plant residuals to dry the plant residuals at a temperature between 90 and 125° C. Since the processing vessel 230 is closed, however, a pressure equalization or relief system can be provided to protect against over-pressurization and to maintain the temperature in the processing vessel 230. In addition to or alternatively, the processing vessel 230 can include a vacuum system or vent system to control the pressure in the processing vessel 230 to a predetermined pressure. After the plant residuals are dried to the desired moisture reduction content, the dried plant residuals may be disposed of.

Figure 3:
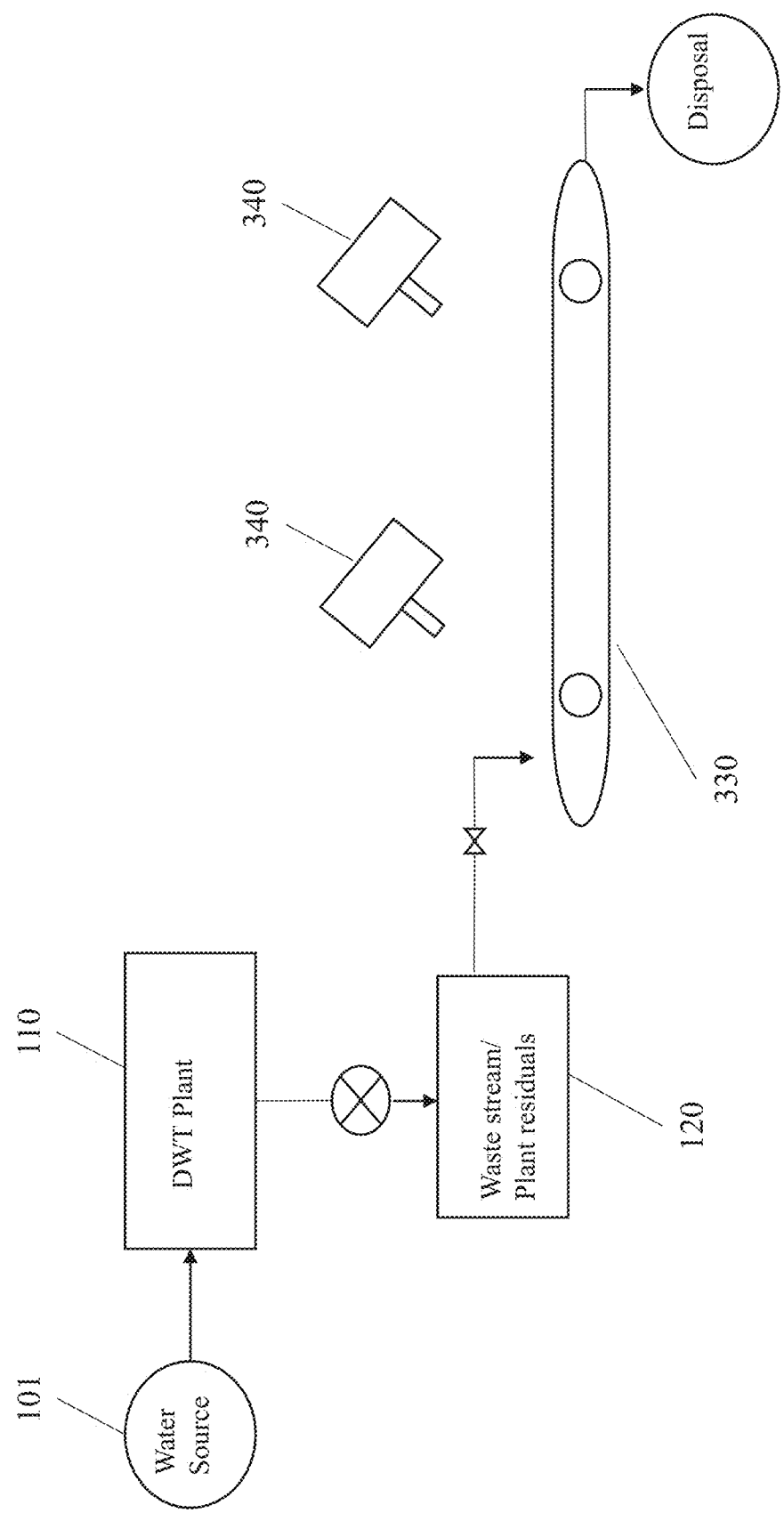
FIG. 3 is a schematic view of a third embodiment of a drinking water treatment process.

Alternatively, in another embodiment of the invention, the plant residuals or waste streams 120 from the DWT plant 110 are not contained in a vessel, but continuously processed. For example, as seen in FIG. 3, the plant residuals or waste streams 120 are continuously transferred to a conveyor belt or trough system 330. At least one or multiple microwave sources 340 in series are then used to dry the plant residuals using constant or varied microwave radiation bombardment intervals that can be at the same or different power and frequency levels, e.g., increased power as the plant residuals is dried. Additionally, the plant residuals or waste streams 120 can be processed before transfer to the conveyor belt or trough system to decrease the water content.

B. Discussion of Various Methods of Operation

The operation of the drying and treatment of the plant residuals will now be described in detail.

Referring back to FIG. 1, in one embodiment of the invention, the method of drying and treating plant residuals or waste streams 120 from a DWT plant comprises the step of obtaining the plant residuals from a water treatment plant which is received in a processing vessel 130. The processing vessel receives the plant residuals or waste streams in a batch filling operation by transferring the plant residuals or waste streams using a pump, conveyor, or other transferring device.

The plant residuals are then irradiated in the processing vessel 130 using microwave radiation from a microwave source 140 until the plant residuals are dried to a predetermined moisture content reduction percentage, e.g., 80, 90, 95, or more moisture reduction percentage. The plant residuals may alternatively or in addition to be controlled to a predetermined weight or volume reduction, e.g., volume or weight reduction of 80, 90, 95, 99% or more, where the processing vessel 130 can be provided with level and weight meters. The microwave radiation may be supplied at a power output between 0.1 and 100 kW at 500 MHz to 2500 MHz frequencies to control the temperature to be between 90 and 125° C. in the open processing vessel. The microwave radiation may be applied in predetermined time intervals, e.g., every 1 minute, 5 minutes, 10 minutes, 30 minutes, until the plant residuals are dried to the predetermined moisture content percentage. Additionally, a mixer such as impellers, agitators, and stators, may be used to mix the plant residuals or waste stream in the processing vessel 130.

The processing vessel 130 may be formed of ceramic materials. It was surprisingly found that the use of ceramic materials accelerated the drying process. Not wishing to be bound by theory, but it is understood that the ceramic material reflected the microwave radiation and radiant heat from the microwave source and heated plant residuals for the continued heating of the plant residuals.

After the irradiating and the drying was complete, the method further comprises the step of disposing of the dried plant residuals by landfilling, land application, or deep well injection. For example, the dried plant residuals can be pumped, scraped, or otherwise removed from the processing vessel 130 and transported to a vessel or transport for disposal.

In the second embodiment of the invention, as seen in FIG. 2, the method is similar to the first embodiment, but uses a closed processing vessel 230. In this embodiment, the method further comprises controlling the pressure in the processing vessel 230 to be between 0.2 atmospheres to 5 atmospheres to control the temperature of the processing vessel between 30 and 125° C. After the drying is complete, the dried plant residuals are disposed of.

The third embodiment is a continuous process, as opposed to being a batch operation. In this case, the method of drying and treating plant residuals or waste streams 120 from a DWT plant comprises the step of obtaining the plant residuals from a water treatment plant which are received on a conveyor or trough system 330. The plant residuals are then irradiated with microwave radiation from at least one microwave source 340 or a plurality of microwave sources in series.

When multiple microwave sources are used, the microwave sources may be varied having different operating power and frequencies to aid in the drying and treatment process. For example, the first microwave source 340 may be at a higher power and lower frequency to dry or treat the plant residuals more quickly, and the second microwave source may be at a lower power and higher frequency to further dry or treat the plant residuals or waste steam. The multiple microwave sources may also be arranged so that the plant residuals are only irradiated in predetermined time intervals, e.g., every one minute, five minutes, or ten minutes, before the next irradiation treatment.

After the drying or treatment reaches a predetermined criteria, e.g., moisture, weight, or volume reduction percentage, the dried plant residuals are disposed of.

Examples are provided below to illustrate the effects and advantages of the various embodiments of the present invention.

As a result of the need to treat these plant residuals, studies were conducted to identify the most effective drying technique of the plant residuals or waste streams, which were received from different processes in drinking water treatment plants for content and solids analysis. Specifically, filter backwash water from iron/arsenic removal treatment (GCBW); backwash sludge from iron/arsenic removal treatment (CLS); backwash sludge from iron coagulation/arsenic removal (GLS); and wastewater recovered from the regeneration of iron-based adsorptive media (TPW) were studied. With the exception of TPW, the wastes were primarily suspensions of arsenic-containing iron solids. TPW was produced as a result of regenerating an exhausted iron media adsorption bed with caustic followed by neutralization with acid and binding with iron which resulted in a waste with similar properties as the filter backwash waters.

These samples were dried using air drying, oven drying, and microwave drying, where different types of analyses were conducted to compare several factors affecting disposal, such as, reduction of weight, volume, and moisture content.

Air drying was conducted by placing a processing vessel, such as a ceramic crucible, and sample inside a Thermo Scientific Hamilton Concept Fume Hood Superstructure with a constant 61 fpm face velocity. The sample was then checked periodically to record observations and drying time. Samples were typically dry within 4 to 5 days based simply on visual examination or by measuring moisture content, where the development of cracks, small fissures, and clumps of solids at the bottom of the crucible were signs of dryness. Once dried, the ceramic crucible and dry sample were placed on an electronic scale and the weight was recorded. The sample was removed from the evaporation crucible and the dried sample was then carefully poured into a clear 20 ML vial and capped tightly for further analysis.

In the conventional oven drying procedure, the ceramic evaporation crucible and sample were placed inside an oven (e.g., model 20AF, Quincy Lab Inc.) that was set at 110±5° C. The sample was checked periodically to record the amount of time it took to dry. Samples were usually dry within 5 to 8 hours, where the residual was considered dry when small fissures at the bottom center or solids clumped together or when they met the same criteria as applied to air drying. Once dried, the ceramic crucible and dry sample was placed immediately into a desiccator and the sample was allowed to cool completely (between 15 to 30 minutes) in the desiccator. Once dried, the ceramic crucible and dry sample was placed on an electronic scale and the weight was recorded. The sample was removed from the evaporation crucible and the dried sample was then carefully poured into a clear 20 mL vial and capped tightly for further analysis.

Using the inventive microwave drying method, the ceramic evaporation crucible and sample were placed inside a microwave (e.g., model RGC7702, Rival, 900 W, 2450 MHz). The microwave was placed into a Thermo Scientific Hamilton Concept Fume Hood Superstructure with a constant 61 fpm face velocity. The sample was dried in the microwave oven in five minute intervals until the sample appeared nearly dry and then was microwaved in one minute intervals until completely dried as defined earlier. Samples were typically dry within 10 to 20 minutes. Once dried, the ceramic crucible and dry sample were placed immediately into a desiccator, where the sample was allowed to cool to room temperature (approximately 30 minutes) in the desiccator. The sample was scraped from the evaporation crucible and the dried sample was poured into a clear, 20 mL vial and capped tightly for further analysis.

The different drying processes were operated in batch mode operation with the processing vessel having an open configuration evaporation process which prevents the buildup of pressure. Specifically, the drying tests were performed in ceramic crucibles, which were shallow 150 mL crucibles that featured a lip, flat bottom, and glazing, except for the rim and a section of the outside bottom surface were used. The crucibles were highly resistant to chemical interactions and suitable in high temperature applications (up to 1150° C.). It was surprisingly found that the ceramic containers used in the present disclosure heated faster than earlier reported versions and was found to be more sustainable than existing market processes, e.g., the different ceramic, refractive or china crucibles were used for heat acceleration.

The results of the different drying methods are shown below in Table 1. In testing the TPW sample, a 100 mL sample was initially used, but the air drying method showed extremely slow progress after one week, so the sample was switched to 20 mL and was tracked on a weekly basis thereafter.

TABLE 1

| Residual | Method | Sample Size (mL) | Time to Dry Sample (hours) | Volume Reduction (%) | Weight Reduction (%) | Moisture Content Reduction (%) |
|---|---|---|---|---|---|---|
| GCBW | Air | 100 | 96 | 98.8 | 99.86 | 80.35 |
|  | Oven | 100 | 5.5 | 99.66 | 99.97 | 79.99 |
|  | Micro | 100 | 0.2 | 99.8 | 99.92 | 84.84 |
| CLS | Air | 100 | 102 | 99.73 | 99.72 | 75.74 |
|  | Oven | 100 | 5.63 | 99.55 | 99.87 | 99.08 |
|  | Micro | 100 | 0.25 | 96.5 | 99.66 | 59 |
| GS | Air | 100 | 144 | 97.6 | 97.43 | 78.15 |
|  | Oven | 100 | 6.23 | 97.43 | 98.01 | 89.06 |
|  | Micro | 100 | 0.22 | 97 | 98.09 | 93.49 |
| TPW | Air | 20 | — | — | — | — |
|  | Oven | 100 | 6 | 91 | 94.69 | 89.99 |
|  | Micro | 100 | 0.25 | 83 | 95.72 | 92.64 |
| TPW* | 1 week | 20 | — | — | 90.54 | 66.63 |
|  | 2 weeks | 20 | — | — | 92.21 | 72.62 |
|  | 3 weeks | 20 | 504 | 82 | 94.31 | 81.86 |

Figure 4:
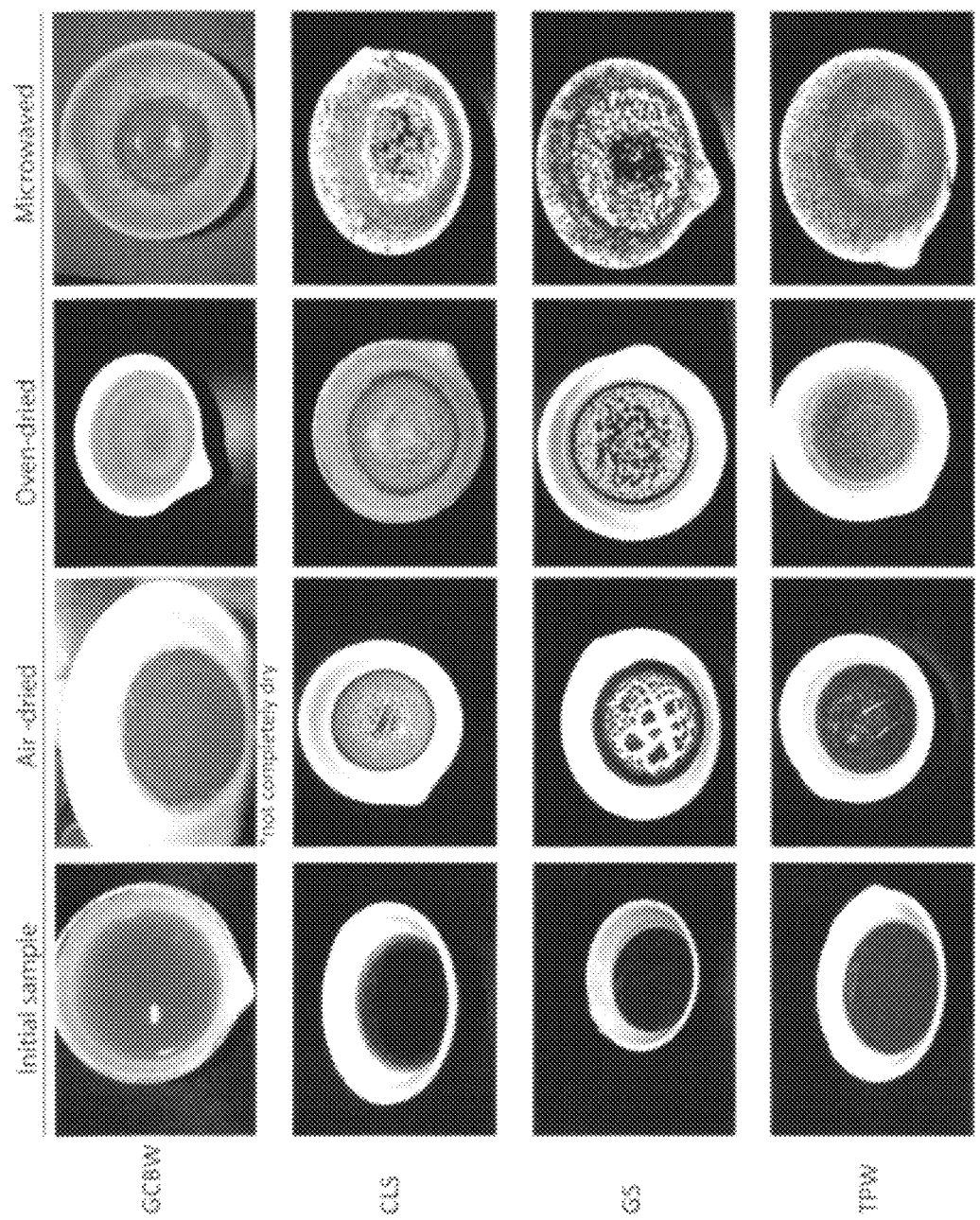
FIG. 4 illustrates the different residuals from samples after different drying methods were used.
Figure 5:
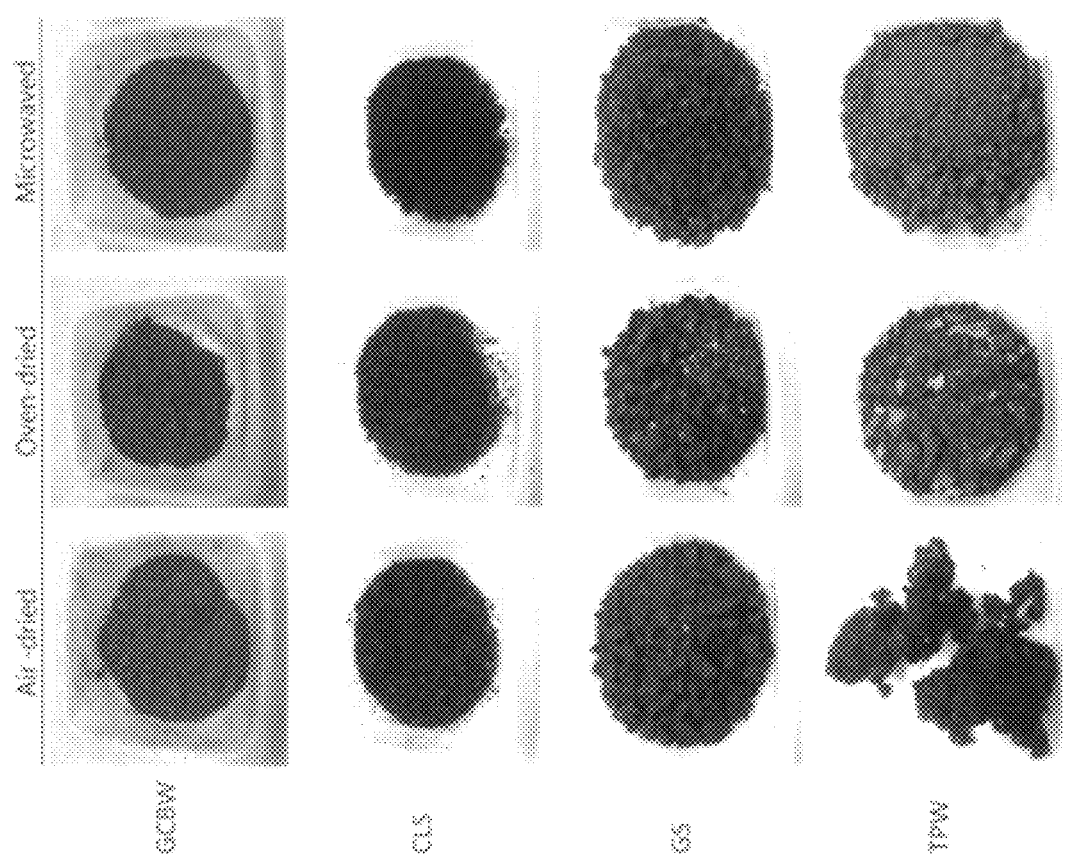
FIG. 5 illustrates the different residuals of the dried samples after being removed from the crucibles.
Figure 6:
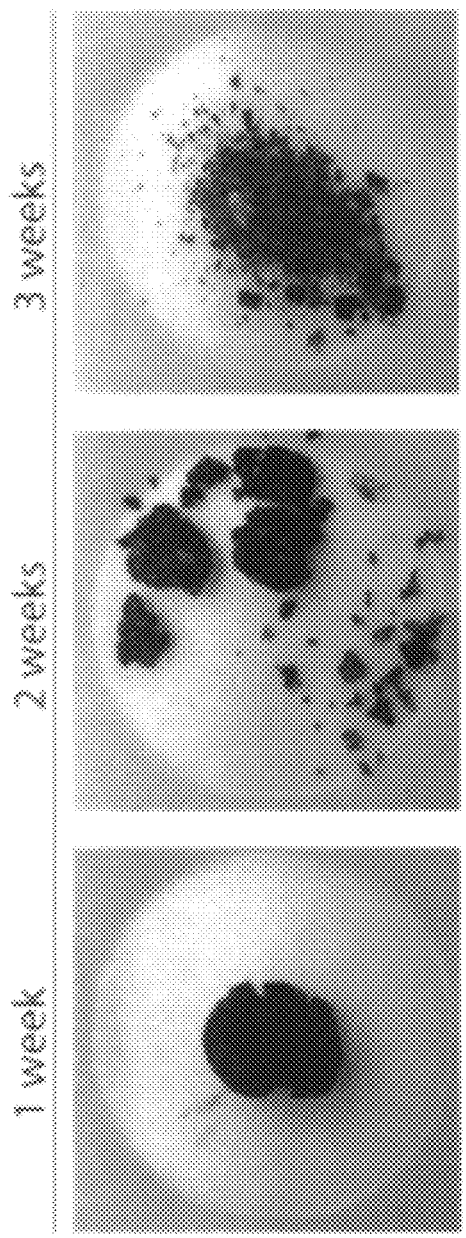
FIG. 6 illustrates the air drying process of a sample.
Figure 7:
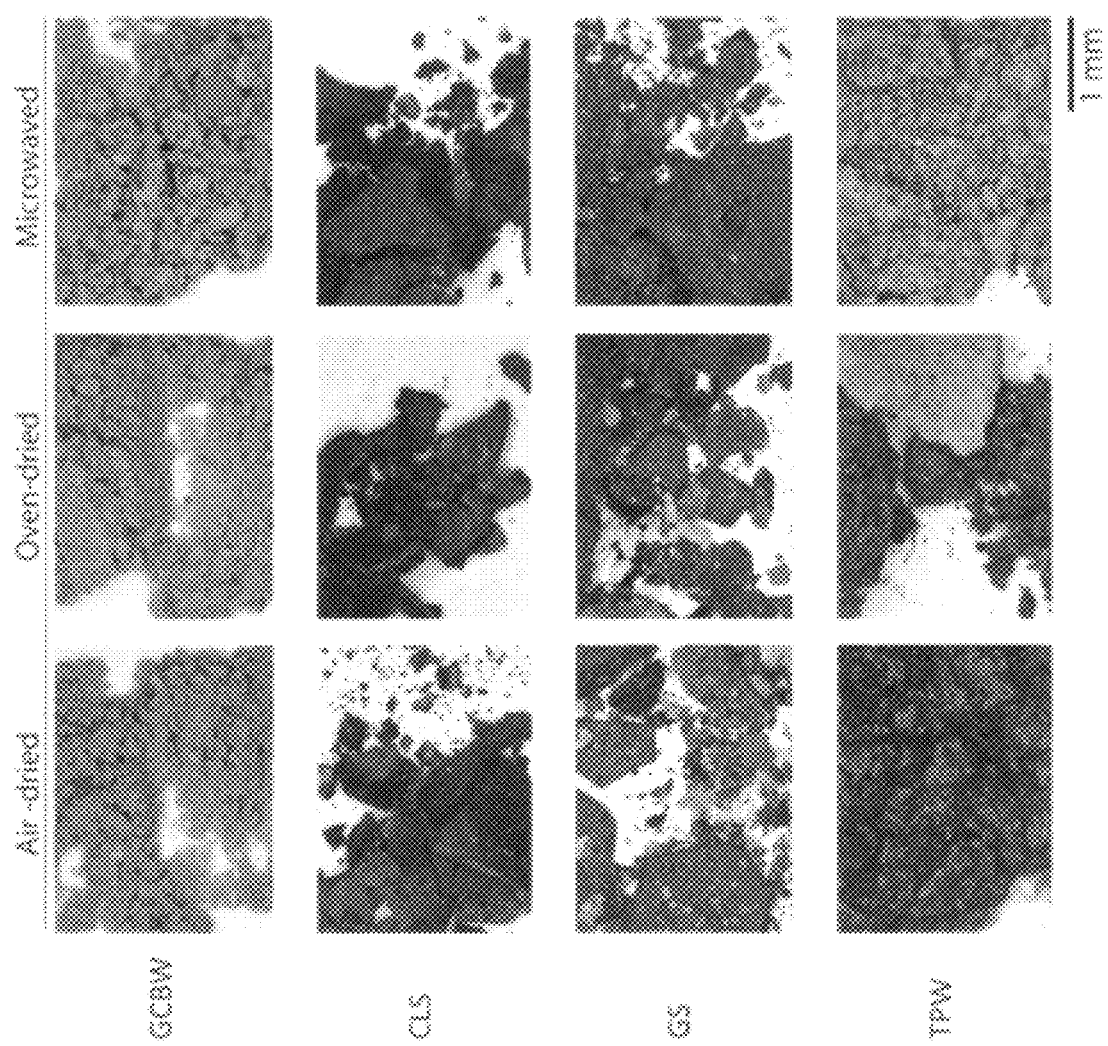
FIG. 7 illustrates the different residuals of the dried samples after being removed from the crucibles.

As seen in Table 1, the microwave drying method dried the samples in shorter periods of time, e.g., between 0.2 and 0.25 hrs, than the air drying and oven drying methods, while maintaining high product quality. For example, as seen in FIGS. 4, 5, and 7, the microwave drying method produced dried residuals having similar characteristics as the air-dried and oven-dried plant residuals with respect to size and clumping. FIG. 6 shows that the air-drying method, while it results in a dried product, had the longest drying time. It is appreciated that while the moisture content reduction using the microwave method did not always produce the lowest reduction percentage, it was determined to be an advantage over the conventional drying methods due to its volume, weight, and moisture content reduction and time for drying. That is, not only is the microwave drying and treatment method quicker than the conventional drying methods, such method reduces environmental impact and is more sustainable than the conventional drying methods for the treatment of drinking water treatment plant residuals.

It was also surprisingly found that the use of the ceramic container such as, alumina, refractive materials, or china, accelerated the drying process by accelerating the heating during microwave irradiation.

That is, the present method and apparatus for treating residuals from a water treatment plant has the following advantages:

1) Significantly reduced drying time demonstrated at bench-scale with effective water removal/volume reduction.

2) Improved overall efficiency and capacity for plant residual or waste treatment over conventional drying methods.

3) Higher processing speeds, with faster start-up and shutdown.

4) Better quality and quality control versus time.

5) Reduced fire, explosion, toxic hazards, to have safer operations.

6) Reduced volatilization of hazardous constituents through improved temperature control.

7) Reduced environmental impact, for better sustainability.

8) Reduced the volume, which translates to lower costs for transport and waste disposal.

It is appreciated that variations of the invention are interchangeable without altering the inventive method and apparatus. Additionally, while the methods of operation have been discussed above in detail, the sequence of the steps is not limited to the above described method. The sequence of the steps may be performed in other orders as needed for the drying and treatment of plant residuals. The invention is not to be limited by the description of exemplary embodiments of the invention, but only by the scope of the appended claims.

The invention claimed is:

1. A method for treating residuals from a drinking water treatment plant comprising the steps of:
    obtaining heated plant residuals from a drinking water treatment plant in a processing vessel, and
    irradiating the plant residuals in the processing vessel using microwave radiation to dry the heated plant residuals from the drinking water treatment plant by controlling temperature in the processing vessel to be between 90 and 125° C.,
    wherein the processing vessel is formed of ceramic materials.

2. A method for treating residuals or waste streams from a drinking water treatment plant comprising the steps of:
    obtaining plant residuals or waste streams from a drinking water treatment plant in a processing vessel, and
    drying and treating the plant residuals or waste streams by irradiating the plant residuals in the processing vessel by using microwave radiation from a microwave source, at a power output between 0.1 and 100 kW at 500 MHz to 2500 MHz frequencies to control a temperature in the processing vessel to be between 90 and 125° C.,
    wherein the processing vessel comprises ceramic, refractive, or china materials that reflect radiation.

3. The method according to claim 2, wherein the processing vessel is open to atmosphere.

4. The method according to claim 2, wherein the irradiating of the plant residuals occurs in five minute intervals until the plant residuals are dried to at least an 80% moisture reduction percentage.

5. The method according to claim 2, further comprising a step of disposing of the dried plant residuals by landfilling, land application, or deep well injection.

6. The method according to claim 2, where the plant residuals are dried to at least 80% volume or weight reduction.

7. The method according to claim 2, where the plant residuals are dried to at least an 80% moisture reduction percentage.

8. The method according to claim 2, wherein the obtaining of the plant residuals from the water treatment plant comprises processing water by at least one of filtration, precipitative softening, membrane separation, ion exchange, activated carbon filtration, disinfection, chlorination, sedimentation, and coagulation.

9. The method according to claim 2, wherein the plant residuals or waste streams comprise at least one member selected from the group consisting of filter backwash water from iron/arsenic removal treatment (GCBW), backwash sludge from iron/arsenic removal treatment (CLS), backwash sludge from iron coagulation/arsenic removal (GLS), and wastewater recovered from the regeneration of iron-based adsorptive media (TPW).

10. The method according to claim 2, wherein the microwave radiation is provided by a magnetron powered between 0.1 and 50 kW.

11. The method according to claim 10, wherein the microwave radiation has a wavelength between 5 centimeters and 40 centimeters.

* * * * *